United States Patent [19]
Behlke et al.

[11] Patent Number: 5,400,862
[45] Date of Patent: Mar. 28, 1995

[54] POWER TAKEOFF STRADDLE BEARING

[75] Inventors: Darwin D. Behlke, Kenosha; Joseph C. Terranova, New Berlin; Alvin G. Ziegler, Racine, all of Wis.

[73] Assignee: Twin Disc Incorporated, Racine, Wis.

[21] Appl. No.: 50,834

[22] Filed: Apr. 21, 1993

[51] Int. Cl.6 .......................................... B60K 17/28
[52] U.S. Cl. ...................................... 180/53.1; 74/11
[58] Field of Search ........................... 74/11; 180/53.1

[56] References Cited

U.S. PATENT DOCUMENTS

| | | |
|---|---|---|
| 1,633,208 | 6/1927 | Haubert .......................... 180/53.1 |
| 2,626,125 | 1/1953 | Gustafson . |
| 3,059,505 | 10/1962 | Reicks . |
| 3,577,789 | 5/1971 | Sansam . |
| 3,587,331 | 6/1971 | Moss . |

*Primary Examiner*—Karin L. Tyson
*Attorney, Agent, or Firm*—Nilles & Nilles

[57] ABSTRACT

A straddle bearing incorporates a U-shaped frame receiving bearings which support an output shaft of a PTO assembly. The bearings flank or straddle a sheave or other drive member which is fixed to the output shaft. Radial loads imposed on the drive member are transmitted to the U-frame as opposed to the clutch and flywheel. The sheave and U-frame are dimensioned to permit replacement of belts or other torque transfer elements without disassembling the U-frame. In addition to being supported on the clutch housing, the U-frame can be supported on a beam and/or a bracket connected to the prime mover frame or a frame of the driven device. The configuration of the U-frame permits adjustment of the orientation of the U-frame with respect to the clutch housing, and also permits the mounting of an auxiliary drive member on the output shaft.

22 Claims, 4 Drawing Sheets

POWER TAKEOFF STRADDLE BEARING

BACKGROUND OF THE INVENTION

1. Field of the Invention

The invention relates to bearings and, more particularly, relates to a straddle bearing for an output shaft of a power takeoff assembly.

2. Discussion of the Related Art

Power takeoff assemblies (PTOs) are well known and are employed to transmit torque from a prime mover such as an internal combustion engine to a remote device. Such assemblies typically employ a driven output shaft which is connected to a clutch and which has a drive member such as a sheave or a sprocket mounted thereon for transmitting torque to a driven member such as a sheave or sprocket of the remote device via a belt or chain. The shaft is in most instances cantilevered from the rear end of the PTO clutch housing. This may cause problems when side loads are applied to the shaft during operation because such loads may be transmitted to the engine flywheel, thus increasing wear on the assembly. This problem becomes more pronounced when relatively long shafts are employed and/or when the PTO is subject to heavy side loads.

One way to reduce loads imposed on shafts, flywheels, etc. is to support the sheave or other drive member at a point aft of the outside of the clutch housing. A device supporting a drive member in this manner is disclosed in U.S. Pat. No. 3,587,331 which issued to Moss on Jun. 28, 1971. The device disclosed by Moss employs a tubular housing having a front end fixed to the rear surface of the clutch housing and receiving an output shaft in a central bore formed therethrough. A sheave is rotatably mounted via bearings on the cylindrical exterior of the housing, and is connected to the shaft by a gear which is splined to the free end of the shaft. The tubular housing absorbs at least some of the radial loads imposed on the sheave so that such loads are not imposed on the shaft and the flywheel.

The device disclosed in the Moss patent exhibits several drawbacks and disadvantages. For instance, the sheave must be specially designed and constructed so as to receive the bearings for supporting the sheave on the tubular housing and so as to mesh with the drive gear attached to the shaft. This significantly increases the assembly's complexity, thus increasing its cost and potentially decreasing its reliability. Moreover, the entire or substantially the entire housing is in all instances cantilevered from the rear of the clutch housing and associated support, thus limiting the load bearing capacity of the housing. Moreover, the device disclosed by Moss is incapable of receiving auxiliary sheaves or other drive members, and thus is capable of driving only one remote device at any given time.

OBJECTS AND SUMMARY OF THE INVENTION

It is therefore an object of the invention to provide a power takeoff assembly having a bearing which is simple and economical to construct and to install but which at the same time is versatile, reliable, and absorbs radial loads which would otherwise be imposed through the output shaft of the power takeoff to the associated flywheel.

It is another object of the invention to provide a bearing of the type described above which permits removal of belts or other torque transfer elements without disassembling the unit.

Still another object of the invention is to provide a straddle bearing of the type described above which can be supported at locations aft of the clutch housing, thus increasing the capacity of the bearing to absorb radial loads.

In accordance with one aspect of the invention, these objects are achieved by providing a PTO assembly having an output shaft connected to the clutch and a drive member which is fixed from rotation with respect to the shaft and which thus rotates with the shaft, and which has a drive surface which transmits the torque from the clutch to a torque transfer element such as a belt. The PTO assembly also has a frame which rotatably supports the shaft at a location aft of the drive member and which is open on a side extending longitudinally of the shaft. Preferably, the frame is generally U-shaped and includes front and rear ends receiving the shaft, and a longitudinal base connecting the front and rear ends.

In accordance with a particularly preferred aspect of the invention, in order to further simplify the assembly, the output shaft is supported on the power takeoff assembly by a support assembly consisting of first and second bearings located proximate front and rear ends of the frame, respectively.

In accordance with another aspect of the invention, the output shaft has a free end extending aft of a rear end of the frame. An auxiliary drive member is fastened to the free end of the shaft, thus permitting the simultaneous driving of more than one driven member.

Another object of the invention is to provide a system having a power takeoff assembly of the type described above.

In accordance with this aspect of the invention, a system is provided having a prime mover, a driven member, and a power takeoff assembly which selectively transmits torque from the prime mover to the driven member. The power takeoff assembly includes an output shaft connectable to the prime mover, a torque transfer element, a drive member which is fixed from rotation with respect to the shaft and which has a drive surface which transmits the torque from the prime mover to the driven member via the torque transfer element, and a frame which rotatably supports the shaft at a location aft of the drive member and which is open on a side extending longitudinally of the shaft.

Still another object of the invention is to provide a method of transmitting torque from a clutch to a driven member.

In accordance with this aspect of the invention, the method comprises transmitting torque from the clutch to a rotatable output shaft mounted on a frame, the shaft being rotatably supported on the frame at a location aft of a drive member and being open on a side extending longitudinally of the shaft, transmitting the torque from the shaft to a drive surface of the drive member, and transmitting the torque to a torque transfer element, cooperating with the drive surface of the drive member, without interference from the frame.

The straddle bearing is preferably arranged so as to permit the step of replacing the torque transfer element without dismantling the frame and without removing the drive member, and to permit the step of rotating the frame with respect to the clutch housing.

Other objects, features, and advantages of the present invention will become apparent to those skilled in the art from the following detailed description. It should be understood, however, that the detailed description and specific examples, while indicating preferred embodiments of the invention, are given by way of illustration and not of limitation. Many changes and modifications within the scope of the present invention may be made without departing from the spirit thereof, and the invention includes all such modifications.

BRIEF DESCRIPTION OF THE DRAWINGS

The above and further objects of the invention become more readily apparent as the invention is more clearly understood from the detailed description to follow, reference being made to the accompanying drawings in which like reference numerals represent like parts throughout and in which.

DETAILED DESCRIPTION OF THE PREFERRED EMBODIMENTS

Resume

Figure 1:
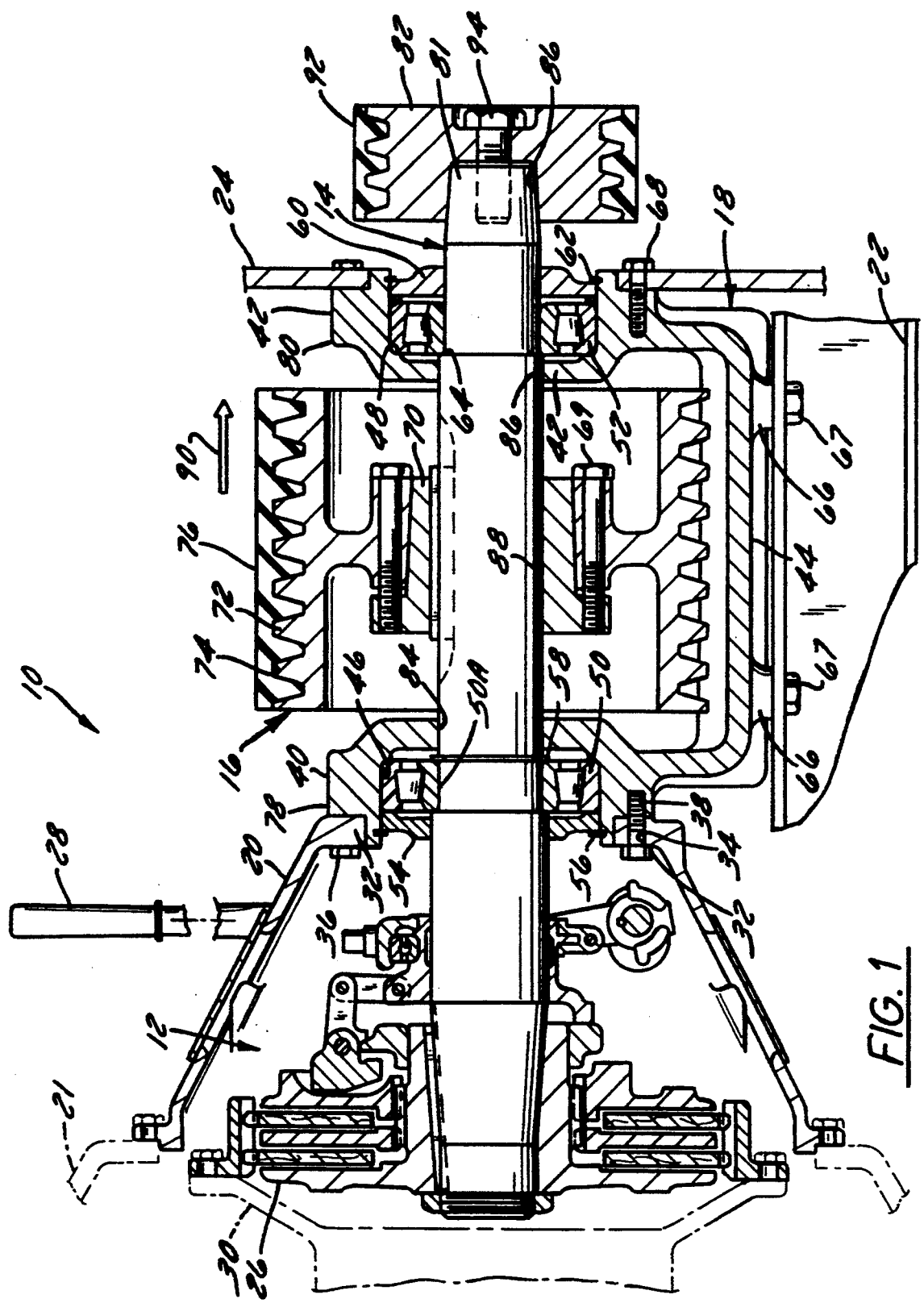
FIG. 1 is a sectional side elevation view of a straddle bearing constructed in accordance with a preferred embodiment of the present invention.
Figure 2:
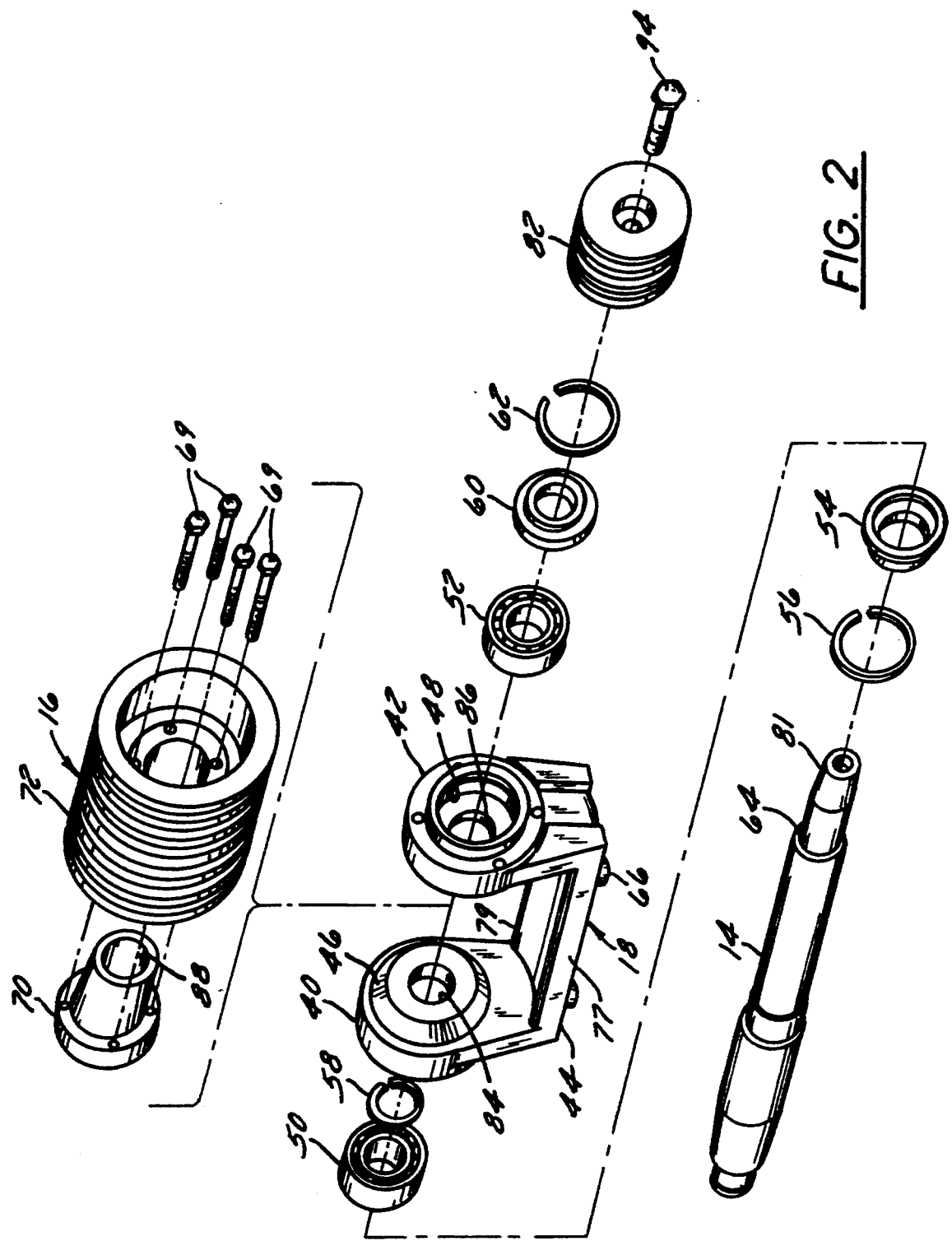
FIG. 2 is an exploded perspective view of the major components of the straddle bearing of FIG. 1.

A straddle bearing constructed in accordance with the present invention incorporates a U-shaped frame receiving bearings which support an output shaft of a PTO assembly. The bearings flank or straddle a sheave or other drive member which is fixed to the output shaft. Radial loads imposed on the drive member are transmitted to the U-frame as opposed to the clutch and flywheel. The sheave and U-frame are dimensioned to permit replacement of belts or other torque transfer elements without disassembling the U-frame. In addition to being supported on the clutch housing, the U-frame can be supported on a beam and/or on a bracket connected to the prime mover frame or the frame of the driven device. The configuration of the U-frame permits adjustment of the orientation of the U-frame with respect to the clutch housing, and also permits the mounting of an auxiliary drive member on the output shaft.

Structure of Power Takeoff Assembly Incorporating Straddle Bearing

Referring now to FIGS. 1-4, a power takeoff assembly (PTO) 10 incorporating a straddle bearing constructed in accordance with the present invention includes a clutch 12 encased in a clutch housing 20, and an output shaft 14 and a drive member 16 supported on a frame 18. Frame 18 is fastened to clutch housing 20 and may, depending on the circumstances, be additionally supported on a support beam 22 and/or on a support bracket 24. As is conventional in the art, PTO assembly 10 transmits torque from a prime mover to a driven member upon engagement of a clutch 12 via the shaft 14, the drive member 16, and a torque transfer element such as a belt 76.

Clutch 12 is, per se, well known and is coupled at its input to a flywheel 30 which is in turn connected to a prime mover (not shown in FIGS. 1-4), and is coupled at its output to shaft 14 via a splined clutch plate 26. Upon actuation of a lever 28, clutch 12 transmits torque to shaft 14 from flywheel 30.

Housing 20 is connected at its front end to the housing 21 for the prime mover. The rear end of housing 20 takes the form of an annular flange 32 having a plurality of holes 34 formed therein which are evenly distributed about the flange 32 and which receive bolts 36 which engage mating holes 38 in the frame 18.

Frame 18 is generally U-shaped and has front and rear ends 40 and 42 connected by a longitudinal base 44 located beyond a radial side of shaft 14. Front and rear ends 40 and 42 have bearing cups 46 and 48 formed therein for receiving respective bearings 50 and 52 which support the shaft 14 on the frame 18 fore and aft of drive member 16. To facilitate assembly, each of the ends 40 and 42 could be divided into two pieces along the lateral centerline of the respective cup 46, 48 such that each cup is formed from two semi-circular halves mating in a horizontal plane. These pieces would be bolted or otherwise fastened to one another to complete the ends.

Bearing 50 is sealed in cup 46 by a labyrinth seal 54 and held in place by first and second snap rings 56 and 58, respectively. Bearing 52 is sealed in cup 48 by a labyrinth seal 60 and is held in place by a snap ring 62 and a step 64 formed on shaft 14. Feet 66 extend transversely from base 44 and can be fastened via bolts 67 to support beam 22 to mount frame 18 on the beam. If desired, an alternate method of supporting the rear end 42 of frame 18 is by fastening it via bolts 68 to the support bracket 24 connected, e.g., to the frame of the prime mover or the driven member.

Drive member 16 in the illustrated embodiment comprises a sheave which is fastened via bolts 69 to a collar 70 which is in turn keyed to the shaft 14, thus preventing rotation of the sheave 16 relative to the shaft 14. This arrangement permits the use of a conventional sheave 16 in the PTO assembly 10 and also permits the replacement of sheave 16 with other sheaves, sprockets or other drive elements. The radial periphery of sheave 16 forms annular ribs 72 acting as a drive surface located beyond a radial side of the shaft 14 which is (1) at least generally opposite frame base 44 and (2) common with the open side of the frame 18. These ribs mesh with grooves 74 formed in a belt 76 comprising the torque transfer element for transmitting torque to a member to be driven such as a sheave. The drive surface 72 of sheave 16 may extend radially beyond the free edges 78 and 80 of front and rear ends 40 and 42 of frame 18 to facilitate the removal of belt 76 from sheave 16 without interference from the frame 18 and without disassembling the unit or the belt 76. At least a portion of drive surface 72 should extend beyond planes containing the side edges 77 and 79 of base 44 so that the belt 76 does not rub against base 44 during operation. Preferably, the free end 81 of shaft 14 extends aft of the rear end 42 of U-frame 18 so as to receive an auxiliary sheave 82, which can be used to transmit torque to a second driven member through a belt 92. In the illustrated embodiment, sheave 82 is fastened to shaft 14 by a single bolt 94.

It should be understood that the sheave 16 and belt 76 could be replaced with any drive member and torque transfer element capable of transferring torque from the peripheral surface of shaft 14 to a driven member. For example, the sheave 16 and belt 76 could be replaced by a corresponding sprocket and chain.

Assembly and Operation of PTO Assembly

First, assuming that a frame having one piece ends is employed, bearing inner race 50A is assembled over shaft 14 and secured axially with snap ring 58, and the sheave 16 is bolted to collar 70 by bolts 69 and placed in frame 18. Then, the shaft 14 is inserted through bores 84 and 86 formed in the ends 40 and 42 of frame 18, and through a bore 88 formed in collar 70, and bearings 50 and 52 are fixed in place by labyrinth seals 54 and 60 and snap rings 56 and 62. Then, the U-frame 18 is bolted to the annular flange 32 of clutch housing 20 by bolts 36, and clutch plate 26 and the associated elements of clutch 12 are fixed to the front end of shaft 14. Housing 20 is then mounted on the prime mover (not shown in FIGS. 1–4), and the belt 76 is slid over the drive surface formed by ribs 72 of the sheave 16. If desired, a second belt 92 can be attached to the auxiliary sheave 82 for driving a second member.

If a frame incorporating two-piece ends were employed, the method described above would be altered by attaching the bearings 50 and 52 and the sheave 16 to the shaft 14 prior to assembling the frame, and by then assembling the frame 18. The frame 18 is assembled by supporting the bearings 50 and 52 on the lower sections of the cups 46 and 48, and by supporting the upper sections of the cups 46 and 48 on the bearings 50 and 52 and connecting the sections of each of the ends 40 and 42 to one another.

Figure 3:
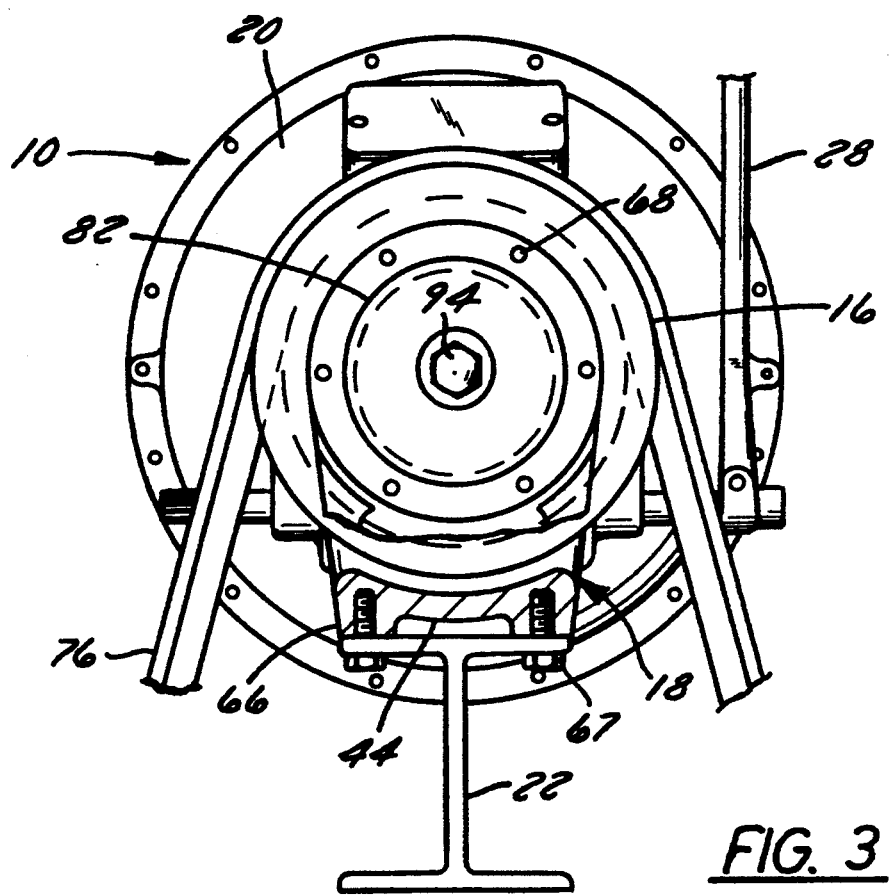
FIG. 3 is an end view of the power takeoff assembly of FIG. 1, illustrating the straddle bearing in a first position and mounted on a first support.
Figure 4:
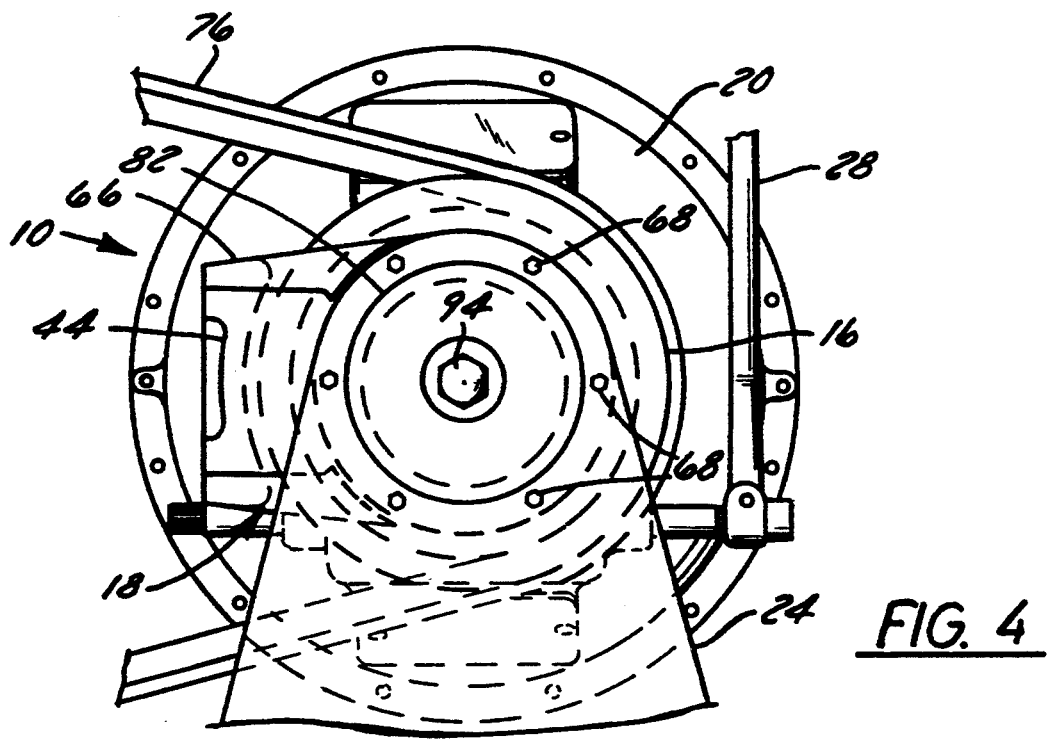
FIG. 4 corresponds to FIG. 3 and illustrates the straddle bearing in a second position and mounted on a second support.

U-frame 18 should normally be oriented as illustrated in FIGS. 1 and 3 so that the feet 66 extend vertically so that, if desired, they can be supported on I-beam 22. However, it may be desirable in some instances to connect the drive member 16 to a driven member located beside or above the shaft 14 rather than below the shaft. Pursuant to the invention, this can be accomplished by orientating the U-frame 18 prior to assembly such that the feet 66 extend in the desired direction. Thus, the U-frame 18 could be rotated clockwise 90° as viewed in FIG. 4 prior to fastening to the clutch housing 20 so that the belt 76 extends to the left rather than downwardly. Although the frame 18 is illustrated as being connected to the bracket 24 in FIG. 4 but not in FIG. 3, the bracket could be utilized with either orientation, and need not be utilized at all, if the U-frame 18 is supported on I-beam 22.

It can thus be seen that, apart from removal of optional bracket 24, the belt 76 can be slid on and off the sheave 16 in the direction of arrow 90 without disassembling any part of the PTO assembly. This facilitates connection to and disconnection of the belt 76 from the sheave 16.

After assembly, the power takeoff assembly 10 can be operated by actuating handle 28 to transfer torque from the prime mover to the driven member through flywheel 30, clutch 12, output shaft 14, sheaves 16 and/or 82, and belts 76 and/or 92. The U-frame 18 absorbs side loads imposed on the sheaves 16 and/or 82. The load bearing capacity of frame 18, already relatively high, can be increased by employing one or more of the supports 22 and 24. This configuration thus permits the transfer of relatively high torques through a relatively long output shaft 14.

It can thus be seen that the PTO assembly 10 is simple, compact, and durable. In fact, an off-the-shelf sheave 16 can be employed because it is fixed directly to a collar 70 by bolts 69 rather than being supported on the shaft 14 by complex bearing and gear arrangements. In addition, only two bearings need be provided to support the entire output shaft 14, thus further simplifying the device.

Exemplary Application of PTO and Straddle Bearing

Figure 5:
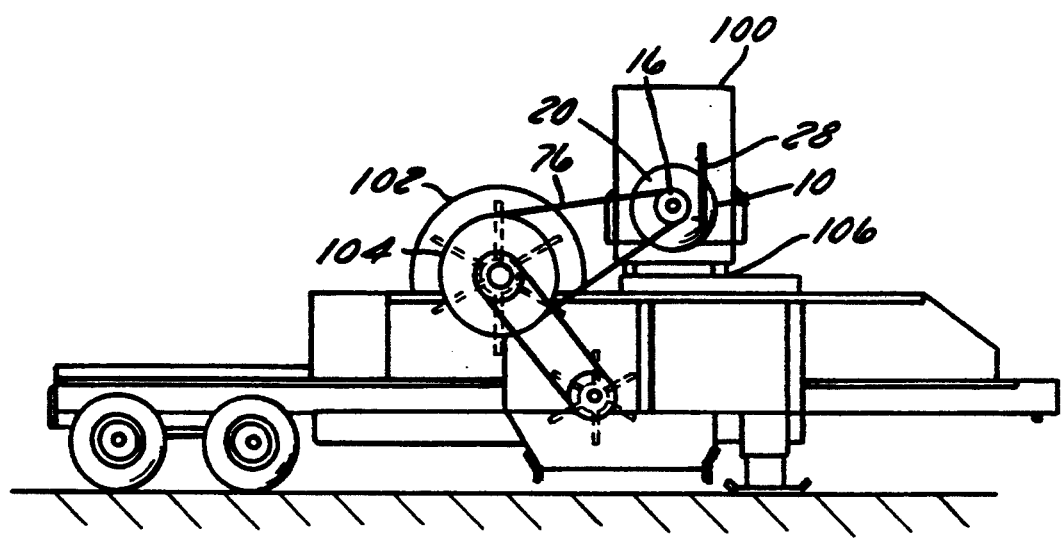
FIG. 5 schematically illustrates an exemplary system employing a power takeoff assembly incorporating a straddle bearing constructed in accordance with the present invention.

The PTO assembly 10 incorporating the inventive straddle bearing as thus far described is ideally suited for applications in which relatively high torques are to be transmitted to side loaded machines. One such application, illustrated in FIG. 5, utilizes the PTO assembly 10 to transmit torque from a prime mover 100 to a driven device comprising a conventional chipper 102. Chipper 102 has a driven member in the form of a driven sheave 104 operatively connected to the sheave 16 by belt 76. Although not illustrated in FIG. 5, the auxiliary support bracket 24 may be mounted on the frame 106 of chipper 102 for providing added support for the U-frame.

In use, sheave 16 is subjected to relatively high transient torques when trees, branches or sticks are fed into a feed device of the chipper 102. Because these torques are transmitted to the U-frame 18 rather than through the shaft 14 and clutch 12 and into the flywheel 30, wear is substantially reduced.

Many changes and modifications could be made to the invention as described above without departing from the spirit and scope thereof. For example, the support beam 22, if present, need not comprise a cantilevered I-beam connected to the prime mover as described, but could comprise a rail of a drag line or any other support. In addition, as discussed above, sheave 16 could be replaced with a sprocket or any other drive element, or could be directly connected to shaft 14 rather than through collar 70.

Other changes and modifications which could be made within the scope of the present invention will become more readily apparent from a reading of the appended claims.

We claim:

1. A power takeoff assembly for transmitting torque from a clutch to a torque transfer element comprising:
   A. an output shaft connected to said clutch;
   B. a drive member which is fixed from rotation with respect to said shaft and which has a drive surface which transmits the torque from said clutch to said torque transfer element; and
   C. a frame which rotatably supports said shaft at a location aft of said drive member and which is open on a side extending longitudinally of said shaft, said drive member and said frame cooperating to define means for permitting said torque transfer element to be connected to and disconnected from said drive member and to be completely removed from said power takeoff assembly while leaving said frame and said torque transfer element completely intact.

2. A power takeoff assembly as defined in claim 1, wherein said shaft is supported on said power takeoff assembly by a support assembly consisting of first and second bearings located proximate front and rear ends of said frame, respectively.

3. A power takeoff assembly as defined in claim 1, wherein said drive member comprises a sheave.

4. A power takeoff assembly as defined in claim 3, wherein said sheave is fastened to a collar which is in turn fixed to said shaft.

5. A power takeoff assembly as defined in claim 1, wherein said shaft has a free end extending aft of a rear end of said frame, and further comprising an auxiliary drive member fastened to said free end of said shaft.

6. A power takeoff assembly for transmitting torque from a clutch to a torque transfer element comprising:
   A. an output shaft connected to said clutch;
   B. a drive member which is fixed from rotation with respect to said shaft and which has a drive surface which is located radially beyond a first side of said shaft and which transmits the torque from said clutch to said torque transfer element; and
   C. a frame which rotatably supports said shaft at a location aft of said drive member and which is open on a side extending longitudinally of said shaft, wherein said open side of said frame is disposed adjacent said drive surface of said drive member, and wherein said frame is generally U-shaped and includes front and rear ends receiving said shaft, and a longitudinal base (1) located radially beyond a second side of said shaft generally opposite said first side and (2) connecting said front and rear ends, each of said front and rear ends extending transversely from a respective longitudinal end of said base towards and beyond said shaft.

7. A power takeoff assembly as defined in claim 6, further comprising a clutch housing, and wherein said front end of said frame is fastened to said clutch housing so as to permit reorientation of said frame with respect to said clutch housing.

8. A power takeoff assembly as defined in claim 6, wherein said longitudinal base of said frame has feet which extend therefrom and which are connectable to a support beam.

9. A system comprising:
   A. a prime mover;
   B. a driven member; and
   C. a power takeoff assembly which selectively transmits torque from said prime mover to said driven member, said power takeoff assembly including
   (1) an output shaft connectable to said prime mover,
   (2) a torque transfer element,
   (3) a drive member which is fixed from rotation with respect to said shaft and which has a drive surface which transmits the torque from said prime mover to said driven member via said torque transfer element, and
   (4) a frame which rotatably supports said shaft at a location aft of said drive member and which is open on a side extending longitudinally of said shaft, said open side of said frame and said drive surface of said drive member being located radially beyond a common side of said shaft.

10. A system as defined in claim 9, wherein said frame is generally U-shaped and has front and rear ends receiving said shaft and, a longitudinal base connecting said front and rear ends.

11. A system as defined in claim 10, further comprising a support bracket connected to said rear end of said frame and to a device incorporating said driven member.

12. A system as defined in claim 10, further comprising a clutch housing which encases at least a portion of said prime mover, and wherein said from end of said frame is detachably fastened to said clutch housing so as to define means for permitting rotation and reorientation of said frame as a unit with respect to said clutch housing.

13. A system as defined in claim 10, further comprising a support beam, and wherein said longitudinal base of said frame has feet which extend therefrom and which are mounted on said support beam.

14. A system as defined in claim 13, wherein said support beam is a cantilevered support beam connected to said prime mover.

15. A system as defined in claim 9, wherein said drive member comprises a sheave and said torque transfer element comprises a belt.

16. A power takeoff assembly for transmitting torque from a clutch to a torque transfer element comprising:
   A. an output shaft having a first end connected to said clutch and having a second end located aft of said clutch;
   B. a drive member which surrounds said shaft between said first and second ends, which is fixed from rotation with respect to said shaft, and which has a drive surface which transmits the torque from said clutch to said torque transfer element; and
   C. a frame which rotatably supports said shaft at a location aft of said drive member and which is open on a side extending longitudinally of said shaft so as to permit a torque transfer element to be slid longitudinally onto and off from said drive member without dismantling said frame, without dismantling said torque transfer element, and without removing said drive member from said frame, wherein said open side of said frame and said drive surface of said drive member are located radially beyond a common side of said shaft.

17. A power takeoff assembly for transmitting torque from a clutch to a torque transfer element comprising:
   A. a clutch encased in a clutch housing;
   B. an output shaft having a first end connected to said clutch and having a second end located aft of said clutch housing;
   C. a drive member which surrounds said shaft between said first and second ends, which is fixed from rotation with respect to said shaft, and which has a drive surface which transmits the torque from said clutch to said torque transfer element and which is located radially beyond a first side of said shaft; and a unitary generally U-shaped frame having a from end which is connected to said clutch housing, a rear end which rotatably supports said shaft at a location aft of said drive member, and a longitudinal base which connects said from and rear ends to one another and which is located radially beyond a second side of said shaft disposed generally opposite said first side, said frame being otherwise open so as to permit a torque transfer element to be slid longitudinally onto and off from said drive member without dismantling said frame, without dismantling said torque transfer element, and without removing said drive member from said frame.

18. A power takeoff assembly for transmitting torque from a clutch to a belt comprising:
   A. a clutch encased in a clutch housing;
   B. a frame which is generally U-shaped and which includes (1) from and rear ends, each of which has an opening formed therein, said front end being connected to said clutch housing;

(2) a longitudinal base connecting said front and rear ends to one another and being located radially beyond a first side of said shaft, and (3) feet, extending transversely from said longitudinal base, for detachable connection to a support beam;

C. a shaft extending longitudinally through said frame and through said openings formed in said from and rear ends of said frame;

D. a collar which is fixed to said shaft between said front and rear ends of said frame;

E. a sheave which is non-rotatably fastened to said collar and which presents a drive surface for said belt which is disposed radially beyond a second side of said shaft opposite said first side; and F. a support assembly which rotatably supports said shaft on said frame, said support assembly including first and second bearings mounted in said openings formed in said front and rear ends of said frame, respectively, wherein said sheave and said frame are dimensioned and configured so as to permit said belt to be slid longitudinally onto and off from said sheave without dismantling said frame, without dismantling said torque transfer element, and without removing said sheave from said frame.

19. A power takeoff assembly as defined in claim 1, wherein said open side of said frame and said drive surface of said drive member are located radially beyond a common side of said shaft.

20. A power takeoff assembly as defined in claim 19, wherein said frame includes first and second radial ends supporting said shaft and a longitudinal base (1) connecting said first and second ends and (2) being located radially beyond a side of said shaft which is opposite the side beyond which said open side of said frame and said drive surface of said drive member are located.

21. A system as defined in claim 9, wherein said frame includes first and second radial ends supporting said shaft and a longitudinal base (1) connecting said first and second ends and (2) being located radially beyond a side of said shaft which is opposite the side beyond which said open side of said frame and said drive surface of said drive member are located.

22. A system comprising:

A. a prime mover;

B. a driven member;

C. a power takeoff assembly which selectively transmits torque from said prime mover to said driven member, said power takeoff assembly including (1) an output shaft connectable to said prime mover, (2) a torque transfer element, (3) a drive member which is fixed from rotation with respect to said shaft and which has a drive surface which is located radially beyond a first side of said shaft and which transmits the torque from said prime mover to said driven member via said torque transfer element, and (4) a frame which rotatably supports said shaft at a location aft of said drive member and which is open on a side extending longitudinally of said shaft, wherein said frame is generally U-shaped and has (1) front and rear ends receiving said shaft and (2) a longitudinal base which (a) connects said front and rear ends of said shaft and which (b) extends along a second side of said shaft disposed opposite said first side; and D. a support beam which extends in parallel with said base of said frame and to which is detachably connected said base of said frame.

* * * * *